United States Patent
Tamukai

(10) Patent No.: US 9,531,435 B2
(45) Date of Patent: Dec. 27, 2016

(54) COMMUNICATION NETWORK AND WIDE AREA COMMUNICATION NETWORK

(71) Applicant: MegaChips Corporation, Osaka-shi (JP)

(72) Inventor: Kengo Tamukai, Ibaraki (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/407,795

(22) PCT Filed: Apr. 23, 2013

(86) PCT No.: PCT/JP2013/061866
§ 371 (c)(1),
(2) Date: Dec. 12, 2014

(87) PCT Pub. No.: WO2014/002594
PCT Pub. Date: Jan. 3, 2014

(65) Prior Publication Data
US 2015/0146801 A1 May 28, 2015

(30) Foreign Application Priority Data
Jun. 25, 2012 (JP) .................................. 2012-141630

(51) Int. Cl.
*H04B 3/00* (2006.01)
*H04B 3/54* (2006.01)
*H04B 3/58* (2006.01)

(52) U.S. Cl.
CPC . *H04B 3/54* (2013.01); *H04B 3/58* (2013.01)

(58) Field of Classification Search
CPC .................................... H04B 3/54; H04B 3/58
(Continued)

(56) References Cited

U.S. PATENT DOCUMENTS 7,816,803 B1* 10/2010 Notohamiprodjo .... H04B 3/542
307/149
8,102,799 B2* 1/2012 Alexander .......... H04L 12/2816
370/255
(Continued)

FOREIGN PATENT DOCUMENTS

CN 201032557 Y 3/2008
CN 101873009 A 10/2010
(Continued)

OTHER PUBLICATIONS

International Preliminary Report on Patentability and Written Opinion issued Jan. 8, 2015, in International Application No. PCT/JP2013/061866 (with English translation).
(Continued)

*Primary Examiner* — Dhaval Patel
(74) *Attorney, Agent, or Firm* — Oblon, McClelland, Maier & Neustadt, L.L.P.

(57) ABSTRACT

A first communication device is connected in a conductive state to a first power line extending from a secondary side of a transformer in a high-voltage power receiving apparatus to a primary side of breakers in a plurality of distribution boards that receive power supply from the transformer. A plurality of second communication devices are respectively connected to a plurality of second power lines respectively extending from a secondary side of the breakers in the plurality of distribution boards. Each second communication device performs power line communication using the second power line connected thereto as a transmission path. Upon receipt of a communication signal, each of the first communication device and the plurality of second communication devices generates a new communication signal including information included in the communication signal and sends
(Continued)

the new communication signal through power line communication.

6 Claims, 10 Drawing Sheets

(58) Field of Classification Search
USPC ........ 375/258, 135, 136, 222, 257; 370/311, 370/230, 390, 254, 235, 328, 464, 351
See application file for complete search history.

(56) References Cited

U.S. PATENT DOCUMENTS

2012/0076050 A1\* 3/2012 Masuda ................ H04B 3/54 370/254
2014/0096253 A1\* 4/2014 Garcia Morchon .. H04L 63/145 726/23

FOREIGN PATENT DOCUMENTS

| JP | 8 18490 | 1/1996 |
| JP | 2881774 | 4/1999 |
| JP | 2003 215178 | 7/2003 |
| JP | 2004 236056 | 8/2004 |
| JP | 2005 352532 | 12/2005 |
| JP | 2006 180021 | 7/2006 |
| JP | 2007 143070 | 6/2007 |
| JP | 2012-8894 | 1/2012 |
| WO | WO 2011129071 A1 \* 10/2011 ............... H04B 3/54 |

OTHER PUBLICATIONS

Combined Chinese Office Action and Search Report issued Aug. 6, 2015 in Patent Application No. 201380032235.2 (with English and Japanese language translations).
International Search Report Issued May 21, 2013 in PCT/JP13/061866 Filed Apr. 23, 2013.
Extended European Search Report issued Nov. 30, 2015 in Patent Application No. 13809952.8.
Hendrik C. Ferreira, et al., "Power Line Communications: Theory and Applications for Narrowband and Broadband Communications over Power Lines" John Wiley & Son, XP002751036, Jan. 1, 2010, pp. 320-329.
Notification of Reason(s) for Refusal issued Jan. 5, 2016 in Japanese Patent Application No. 2012-141630 (with English language translation).
Chinese Office Action issued Jan. 29, 2016 in Patent Application No. 201380032235.2 (with English and Japanese Translation).
Chinese Office Action issued on Jun. 2, 2016 in patent Application No. 201380032235.2 with English translation (14 pages).

\* cited by examiner

F I G . 1
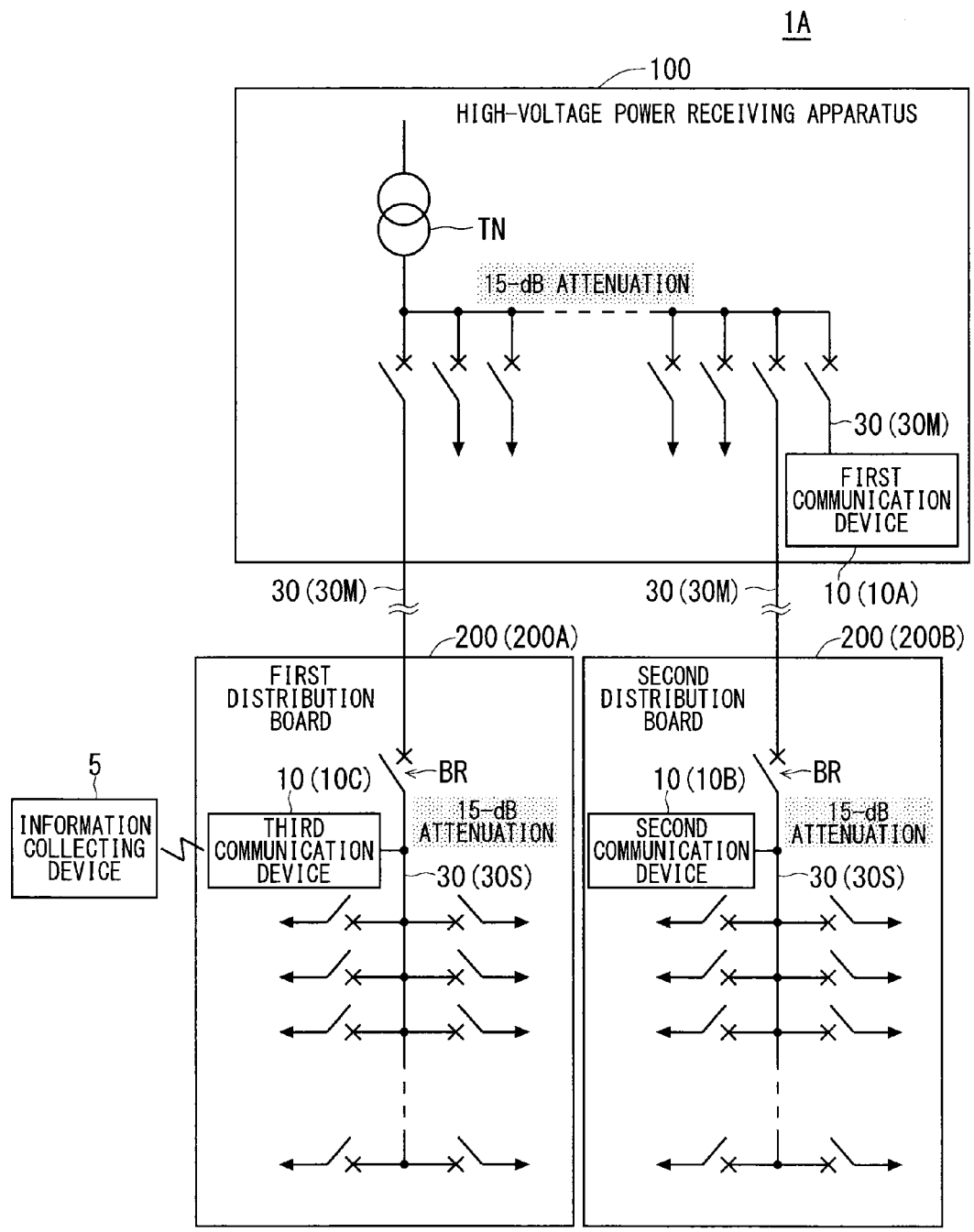

COMMUNICATION NETWORK AND WIDE AREA COMMUNICATION NETWORK

TECHNICAL FIELD

The present invention relates to a communication technology.

BACKGROUND ART

There is offered a power line communication (PLC) technology in which communication is performed using a power line for supplying power to an electrical device as a transmission path (for example, Patent Document 1). In the power line communication, a communication signal having a frequency higher than a commercial power supply frequency is superimposed on the commercial power.

The power line communication is of a communication mode in which the power line connected with an electrical device is regarded as a transmission path, and thus, may be affected by the noise of the electrical device (also referred to as "home appliance noise").

PRIOR ART DOCUMENT

Patent Document

Patent Document 1: Japanese Patent Application Laid-Open No. 08-18490 (1996)

SUMMARY OF THE INVENTION

Problem to be Solved by the Invention

A communication signal that is transmitted over a power line attenuates every time it passes through a branch in the transmission path. Thus, if the communication signal passes through the branch over and over, its signal level decreases. The communication signal is more likely to be affected by the above-mentioned home appliance noise as a result of a reduction in its signal level, which may lead to disabled communication.

The present invention therefore has an object to provide a technology capable of avoiding disabled communication due to the attenuation of a communication signal.

Means to Solve the Problem

A communication network according to a first aspect of the present invention includes: a first communication device connected in a conductive state to a first power line extending from a secondary side of a transformer in a high-voltage power receiving apparatus to a primary side of breakers in a plurality of distribution boards that receive power supply from the transformer, the first communication device performing power line communication using the first power line as a transmission path; and a plurality of second communication devices respectively connected to a plurality of second power lines respectively extending from a secondary side of the breakers in the plurality of distribution boards, each of the plurality of second communication devices performing power line communication using each of the second power lines respectively connected thereto as a transmission path. Upon receipt of a communication signal, each of the first communication device and the plurality of second communication devices generates a new communication signal including information included in the communication signal and sends the new communication signal through power line communication.

In the communication network according to a second aspect of the present invention, in the first aspect, the first communication device is connected to a point on a transmission path at which an amount of attenuation of a communication signal is halved when power line communication is directly performed between a second communication device and another second communication device, which are included in the plurality of second communication devices, using a power line coupling the second communication device and the another second communication device as a transmission path.

In the communication network according to a third aspect of the present invention, in the first aspect, the first power line branches off into a plurality of power lines to be connected to the primary side of the breakers in the plurality of distribution boards, and the first communication device is connected to an available power line that is not connected with the primary side of the breakers in the plurality of distribution boards among the plurality of power lines branched off from the first power line.

In the communication network according to a fourth aspect of the present invention, in the first aspect, the first communication device performs wireless communication, the high-voltage power receiving apparatus has a plurality of transformers therein, the first communication device is provided for each of the transformers in the high-voltage power receiving apparatus, and the first communication devices wirelessly communicate with each other.

The communication network according to a fifth aspect of the present invention, in the first aspect, further includes a host communication device that performs wireless communication. Each of the plurality of second communication devices measures a power consumption amount of a load that receives power supply from each of the distribution boards, and performs wireless communication. Each of the plurality of second communication devices sends a communication signal including information on the power consumption amount through power line communication and wireless communication. The host communication device wirelessly collects the information on the power consumption amount via the plurality of second communication devices.

A wide-area communication network according to the present invention includes: a plurality of narrow-area communication networks respectively corresponding to a plurality of transformers in a high-voltage power receiving apparatus; and Et plurality of host communication devices that perform wireless communication. Each of the plurality of narrow-area communication networks includes: a first communication device connected in a conductive state to a first power line extending from a secondary side of a corresponding transformer among the plurality of transformers in the high-voltage power receiving apparatus to a primary side of breakers in a plurality of distribution boards that receive power supply from aid transformers, the first communication device performing power line communication using the first power line as a transmission path; and a plurality of second communication devices respectively connected to a plurality of second power lines respectively extending from a secondary side of the breakers in the plurality of distribution boards, each of the plurality of second communication devices performing power line communication using a second power line connected thereto as a transmission path. In each of the plurality of narrow-area communication networks, upon receipt of a communication signal, each of the first communication device and the plurality of second communication devices generates a new communication signal including information included in the communication signal and sends the new communication signal through power line communication. In each of the plurality of narrow-area communication networks, the plurality of second communication devices are capable of communicating with only a single host communication device among the plurality of host communication devices.

Effects of the Invention

The present invention can avoid disabled communication due to the attenuation of a communication signal.

These and other objects, features, aspects and advantages of the present invention will become more apparent from the following detailed description of the present invention when taken in conjunction with the accompanying drawings.

BRIEF DESCRIPTION OF DRAWINGS

FIG. 1 shows a configuration of a communication system according to a first embodiment.

DESCRIPTION OF EMBODIMENTS

Each of the embodiments will be described below with reference to the drawings. The elements denoted by the same references in different drawings denote the same or like elements.

1. First Embodiment

[1. Configuration]

Figure 2:
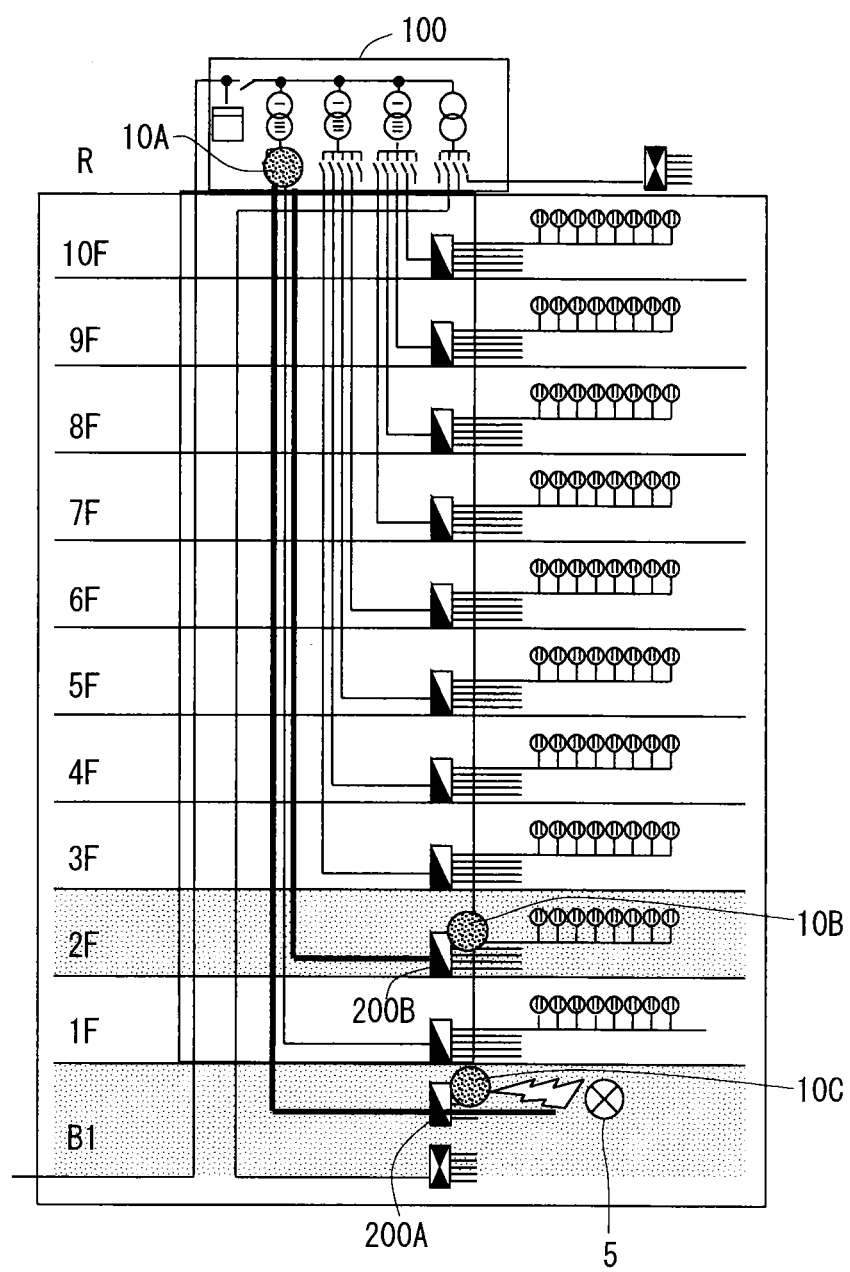
FIG. 2 shows an example application for the communication system.

FIG. 1 shows the configuration of a communication system 1A according to a first embodiment. FIG. 2 shows an example application for the communication system 1A.

As shown in FIG. 1, the communication system 1A includes a plurality of communication devices 10 (10A to 10C) and an information collecting device 5 having a wireless communication function.

The communication devices 10A to 10C are respectively connected to power lines 30 in an electrical facility constituting a power system of a facility (structure) such as a building or a hotel.

To be specific, with reference to FIG. 1, among the plurality of communication devices 10A to 10C, the first communication device 10A is provided in a high-voltage power receiving apparatus 100. The first communication device 10A is connected in the conductive state to a first power line 30M extending from a secondary side of a transformer TN in the high-voltage power receiving apparatus 100 to a primary side of breakers BR in distribution boards 200A and 200B.

The second communication device 10B is provided in the second distribution board 200B (200) that receives power supply from the transformer TN. The second communication device 10B is connected in a conductive state to a second power line 30S extending from a secondary side of a breaker BR in the second distribution board 200B.

The third communication device 10C is provided in the first distribution board 200A (200) that receives power supply from the transformer TN. The third communication device 10C is connected in a conductive state to another second power line 30S extending from a secondary side of a breaker (for example, earth leakage breaker) BR in the first distribution board 200A.

The communication system 1A having the above-mentioned configuration is actually applied in a building, as shown in FIG. 2. In the case of FIG. 2, the high-voltage power receiving apparatus 100 is provided on the roof of the building, and the first distribution board 200A and the second distribution board 200B are provided on different floors (levels) in the building.

Figure 3:
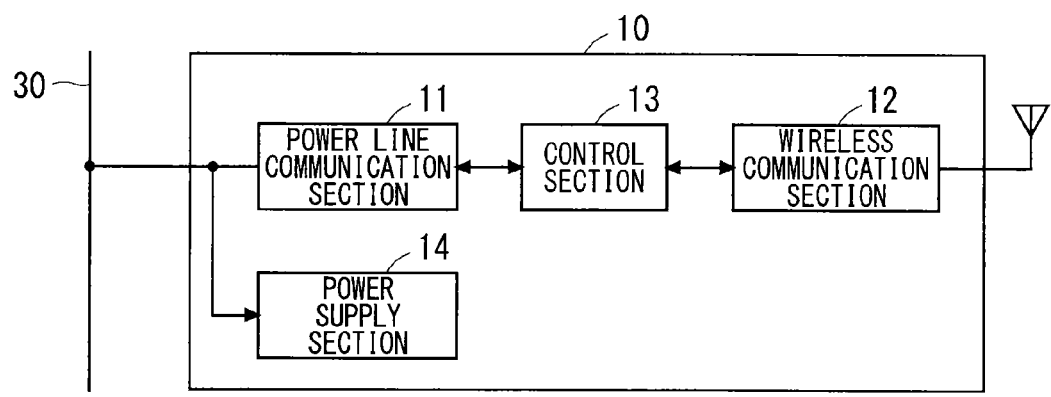
FIG. 3 is a block diagram showing the configuration of a communication device.

Next, the internal configuration of the communication devices 10 (10A to 10C) will be described. FIG. 3 is a block diagram showing the configuration of the communication device 10.

As shown in FIG. 3, the communication device 10 includes a power line communication section 11 that performs PLC (power line communication) through the power line 30, a wireless communication section (wireless communication means) 12 that performs wireless communication, a control section 13 that controls power line communication and wireless communication, and a power supply section 14.

The communication device 10 having the above-mentioned configuration has the function (multihop communication function) as a repeater that relays the received information. To be specific, upon receipt of a signal through power line communication or wireless communication, the communication device 10 generates a new communication signal including the information included in the received signal by the control section 13, and then outputs the new communication signal to the outside through power line communication and wireless communication.

A plurality of communication devices 10, each of which functions as a repeater, are respectively placed in a plurality of electrical facilities such as the high-voltage power receiving apparatus 100 and the distribution boards 200A and 200B that are electrically connected to one another, so that the plurality of communication devices 10 constitute a communication network in cooperation.

The communication device 10 also functions as measurement mean for measuring the power usage. For example, the communication devices 10C and 10B installed in the distribution boards 200A and 200B measure amounts of power (amounts of consumption power) to be consumed by loads (electrical loads) of the lights, electrical devices, air conditioners, and the like that receive power supply from the distribution boards 200A and 200B, to thereby obtain the information on the amount of consumption power (amount-of-power information).

[1-2. Operation of Communication System]

Next, the operation of the communication system 1A will be described by way of an example in which the information collecting device 5 in FIG. 1 collects the amount-of-power information obtained by the second communication device 10B in the second distribution board 200B over the communication network.

In the communication system 1A, the second communication device 10B installed in the second distribution board 200B first obtains amount-of-power information, and then, sends a communication signal including the amount-of-power information through power line communication and wireless communication. The communication signal transmitted from the second communication device 10B is received by the first communication device 10A installed in the high-voltage power receiving apparatus 100 through power line communication.

The first communication device 10A generates a new communication signal including the amount-of-power information included in the received communication signal, and then, sends the communication signal through power line communication and wireless communication. The communication signal transmitted from the first communication device 10A is received by the third communication device 10C installed in the first distribution board 200A through power line communication.

The third communication device 10C generates a new communication signal including the amount-of-power information included in the received communication signal, and then, sends the communication signal through power line communication and wireless communication. The communication signal transmitted from the third communication device 10C is received by the information collecting device 5 through wireless communication.

As described above, the amount-of-power information obtained by the second communication device 10B in the second distribution board 200B is transmitted over the communication network configured with the communication devices 10A to 10C to be conveyed to the information collecting device 5.

The power line communication uses a plurality of communication devices 10 to relay and transmit information, avoiding disabled communication due to the attenuation of a communication signal.

Figure 4:
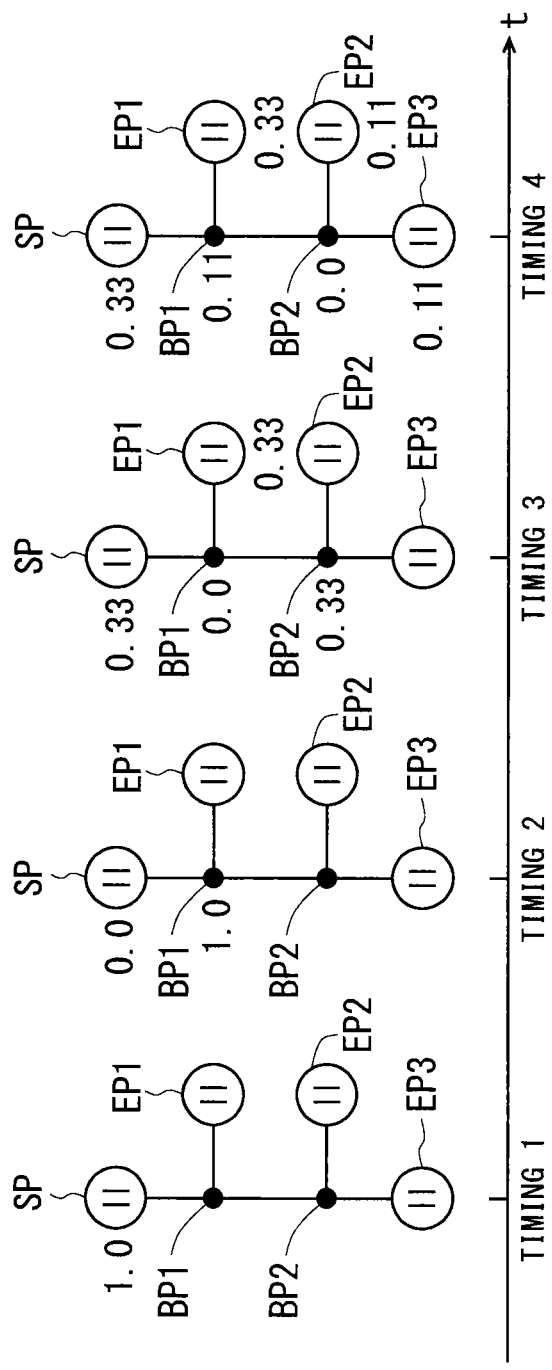
FIG. 4 shows a simplified model of a transmission path.

To be specific, a communication signal transmitted through a power line as a transmission path attenuates at the branch in the transmission path. Such attenuation at a branch will be described using the simplified model of a transmission path. FIG. 4 shows the simplified model of a transmission path. FIG. 4 shows in chronological order the state in which a communication signal having magnitude "1.0" output from a starting point SP passes through each branch to be transmitted through the transmission path. For easy understanding, herein, the signal level of a communication signal is expressed as "magnitude."

A communication signal is evenly distributed at the branch in the transmission path and is absorbed at a termination. For example, as shown in FIG. 4, when a communication signal having magnitude "1.0" is output from the starting point SP in timing 1, the communication signal having magnitude "1.0" is located at a first branch point BP1 in timing 2. Then, in the following timing 3, the communication signal of "1.0" is evenly distributed, so that a communication signal of "0.33" is located at each of the starting point SP, a first termination EP1, and a second branch point BP2. In timing 4, the communication signal of "0.33" located at the second branch point BP2 is evenly distributed, so that a communication signal of "0.11" is located at each of the first branch point BP1, the second termination EP2, and a third termination EP3.

As described above, the communication signal passing in the power line attenuates every time it passes through a branch. The attenuation of a communication signal occurs at a branch as well as at a breaker.

For the above-mentioned reason, in power line communication using a power system of a building or the like, a communication device 10 is placed in each electrical facility having many branches and breakers in a power line such that each communication device 10 functions as the repeater that sends a new communication signal including amount-of-power information included in the received signal. This can avoid disabled communication due to the attenuation of a communication signal, reliably transmitting amount-of-power information.

For example, as shown in FIG. 1, if 15-dB attenuation occurs in each of the high-voltage power receiving apparatus 100 and the distribution boards 200A and 200B, the communication signal sent from the second communication device 10B attenuates for 45 dB before reaching the third communication device 10C. In other words, a communication signal attenuates for 45 dB in direct communication without a repeater.

Meanwhile, when the first communication device 10A relays the communication signal sent from the second communication device 10B, the communication signal sent from the first communication device 10A attenuates for 30 dB before reaching the third communication device 10C.

Therefore, in the case where the first communication device 10A relays the communication signal sent from the second communication device 10B, the signal quality of the communication signal reaching the third communication device 10C is substantially improved by 15 dB than in the case of direct communication.

In power line communication, the effects of the noise from electrical products are large and, particularly at a communication band of power line communication performed at low speed (low-speed power line communication), the effects of the noise generated in the induction load of a motor or the like are extremely large. Thus, securing the signal level of a communication signal against such noise is important in communication.

The first communication device 10A is preferably connected to the point on the transmission path at which an amount of attenuation of the communication signal is a half of a total amount of attenuation when power line communication is directly performed between the second communication device 10B and the third communication device 10C, where the power line coupling the second communication device 10B and the third communication device 10C is a transmission path. For this reason, in the case where, for example, there are a plurality of points to which the first communication device 10A can be connected (connection-enabled locations), the first communication device 10A is desirably connected to the point at which an amount of attenuation of the communication signal comes closest to a half of a total amount of attenuation among the plurality of points.

As described above, the first communication device 10A serving as a repeater is placed at a point at which an amount of attenuation of the communication signal when power line communication is directly performed becomes a half thereof or at a point at which it reaches a half thereof, enabling communication while securing the most-balanced signal level of a communication signal.

As described above, the communication system 1A (communication network) includes the communication device (first communication device) 10A and the communication device 10 (second communication device 10B or third communication device 10C). The first communication device 10A is connected in a conductive state to the first power line 30M extending from the secondary side of the transformer TN in the high-voltage power receiving apparatus 100 to the primary side of the breaker BR in the distribution board 200 and performs power line communication using the first power line 30M as a transmission path. The second communication device 10B or third communication device 10C is connected to the second power line 30S extending from the secondary side of the breaker BR in the distribution board 200 and performs power line communication using the second power line 30S as a transmission path. The communication device 10 that performs power line communication using the second power line 30S as a transmission path is provided in each of the distribution boards 200A and 200B that receive power supply from the transformer TN. Upon receipt of a communication signal, each of the communication devices 10A to 10C generates a new communication signal including the information included in the communication signal and then sends the new communication signal through power line communication.

As described above, communication devices 10 are respectively placed in electrical facilities and each of the communication devices 10 functions as a repeater, whereby each repeater sends a new communication signal free from attenuation. This avoids disabled communication due to the attenuation of a communication signal, achieving highly reliable communication.

2. Second Embodiment

Next, a second embodiment will be described. In the communication system 1A according to the first embodiment, a communication network is configured for a single power system that receives power supply from one transformer in the high-voltage power receiving apparatus 100. In a communication system 1B according to the second embodiment, meanwhile, a communication network is configured over a plurality of power systems. The parts of the communication system 1B common to those of the communication system 1A are denoted by the same references, which will not be described here.

[2-1. Configuration]

Figure 5:
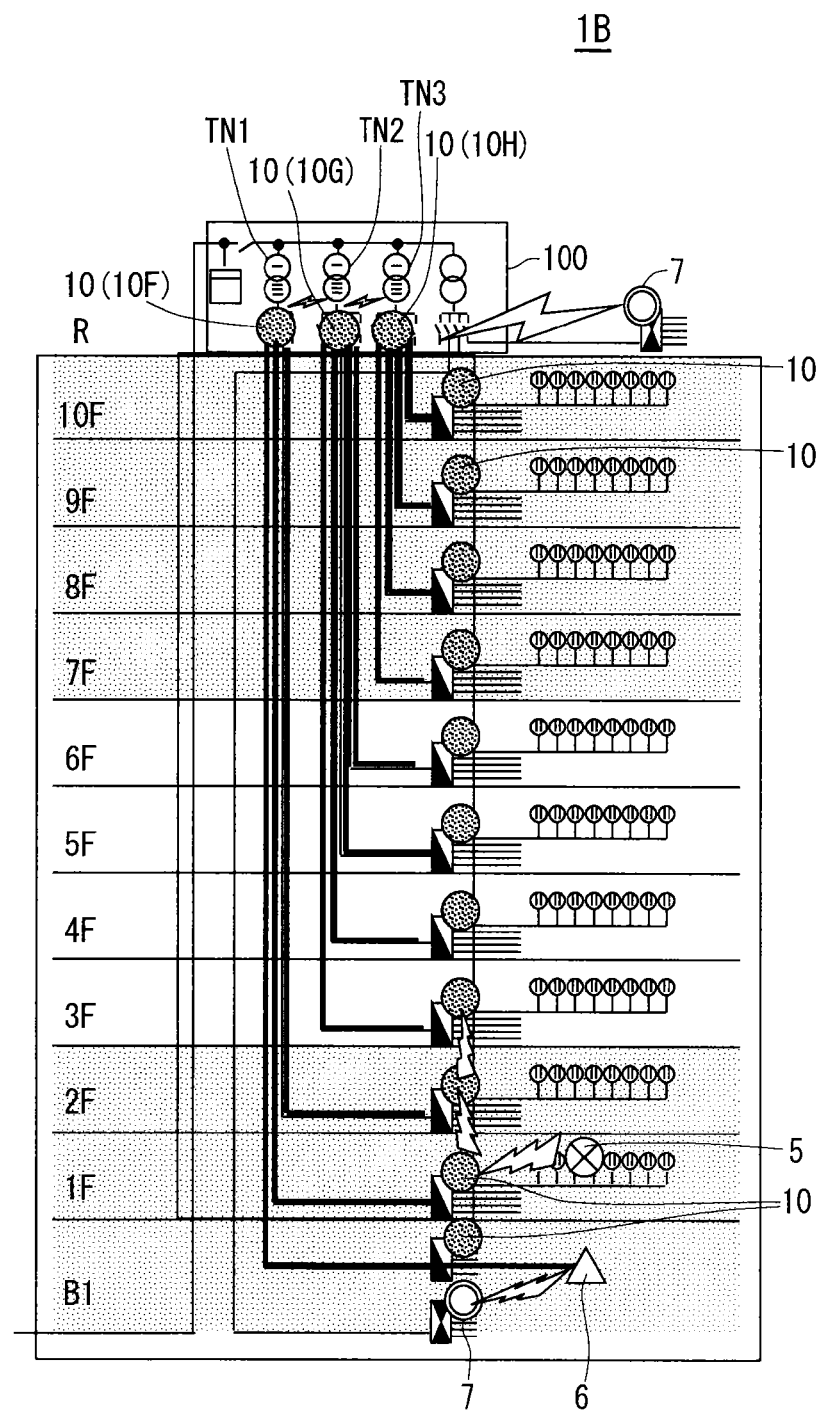
FIG. 5 shows an example application for a communication system according to a second embodiment.

In facilities such as a building, a plurality of transformers are normally provided in the high-voltage power receiving apparatus 100, and power systems are separated on a transformer basis. In the communication system 1B of the second embodiment, a communication network is configured over different power systems (different systems). FIG. 5 shows an example application for the communication system 1B according to the second embodiment.

As shown in FIG. 5, the communication system 1B includes communication devices 10F to 10H on the secondary side of a plurality of transformers TN1 to TN3 in the high-voltage power receiving apparatus 100. Each of the communication devices 10F to 10H is a power line connected to the secondary side of the transformer, which is connected to the power line in a conductive state with the secondary side of the transformer.

The communication devices 10F to 10H provided in the high-voltage power receiving apparatus 100 each have the configuration shown in FIG. 3 and can be connected with one another through wireless communication. Thus, communication between different power systems is enabled by providing the communication devices 10F to 10H on the secondary side of the plurality of transformers in the high-voltage power receiving apparatus 100.

FIG. 5 shows the state in which each of the communication devices 10, which have been respectively provided on the secondary side of a plurality of transformers in the high-voltage power receiving apparatus 100, is provided in a distribution board 200 on each level, so that a communication network is configured for an entire building. In detail, with reference to FIG. 5, a first communication network using a power system from the first basement level (B1) to the second level (2F), a second communication network using a power system from the third level (3F) to the sixth level (6F), and a third communication network using a power system from the seventh level (7F) to the tenth level (10F) are connected through wireless communication by the communication devices 10F to 10H in the high-voltage power receiving apparatus 100, thereby configuring the communication network for the entire building.

The communication network for the entire building is also referred to as a "wide-area communication network," whereas the first communication network, the second communication network, and the third communication network are each also referred to as a "narrow-area communication network."

In FIG. 5, reference 5, reference 6, and reference 7 represent an information collecting device, a plug-in communication device (tap communication device), and a communication device for three phases (three-phase communication device), respectively. The tap communication device 6 and the three-phase communication device 7 have almost the same function as that of the communication device (more precisely, a single-phase communication device for a single phase) 10. In other words, the tap communication device 6 and the three-phase communication device 7 are configured to perform wireless communication and power line communication, thereby functioning as a repeater, which also have a power measuring function. The single-phase communication device 10, the tap communication device 6, and the three-phase communication device 7 are placed to be distributed from one another with respect to the information collecting device 5, and thus, the single-phase communication device 10, the tap communication device 6, and the three-phase communication device 7 are also generically referred to as "distributed communication devices" or "local communication devices." Meanwhile, the information collecting device 5 is also referred to as a "host communication device."

As described above, the communication devices 10F to 10H having a wireless communication function are respectively provided on the secondary side of a plurality of transformers in the high-voltage power receiving apparatus 100, enabling wireless communication between different power systems, which allows a communication network to be configured for the entire facility.

Connecting different power systems through wireless communication can relieve the congestion of communication signals in a transmission path more than connecting different power systems using a coupler for power line communication.

Figure 6:
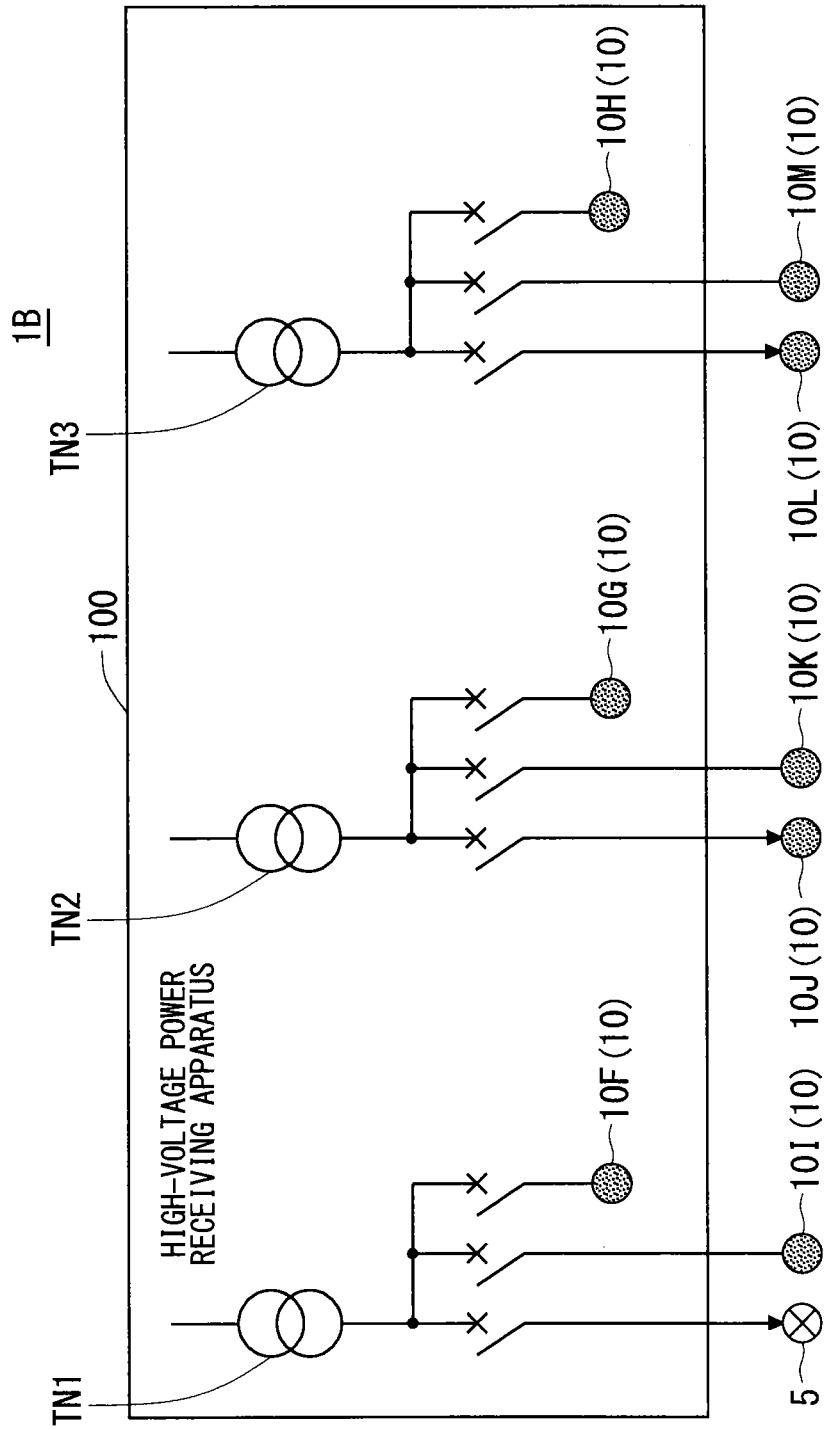
FIG. 6 schematically shows the configuration of the communication system according to the second embodiment.
Figure 7:
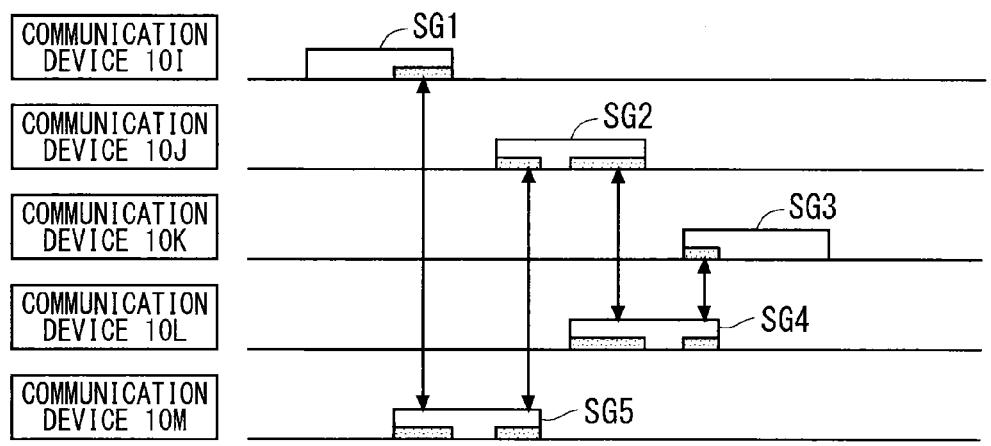
FIG. 7 shows a state of the congestion of communication signals in the case where different power systems are connected using couplers.
Figure 8:
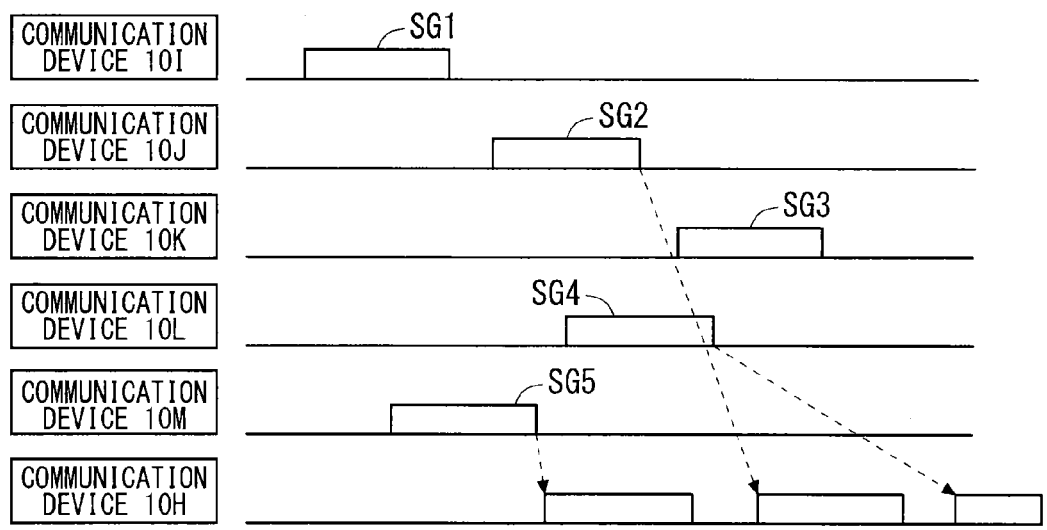
FIG. 8 shows a state of the congestion of communication signals in the case where different power systems are connected through wireless communication.

Description is now given of the mitigation of the congestion of communication signals. FIG. 6 schematically shows the configuration of the communication system 1B. FIG. 7 shows the state of the congestion of communication signals in the case where different power systems are connected using couplers. FIG. 8 shows the state of the congestion of communication signals in the case where different power systems are connected through wireless communication.

FIG. 6 shows the case in which the communication devices 10F to 10H are provided on the secondary side of a plurality of transformers TN1 to TN3 in the high-voltage power receiving apparatus 100, respectively, and the information collecting device 5 is connected to the power system of the transformer TN1.

While different power systems are connected through wireless communication of the communication devices 10F to 10H in FIG. 6, assumed here is the case in which different power systems are connected using couplers for power line communication in place of using the communication devices 10F to 10H.

In this case, if communication devices 10I to 10M provided in the distribution board output communication signals SG1 to SG5 as shown in FIG. 7, respectively, congestion occurs between the communication signal SG1 and the communication signal SG5, between the communication signal SG2 and the communication signal SG5, between the communication signal SG2 and the communication signal SG4, and between the communication signal SG3 and the communication signal SG4.

Meanwhile, connecting different power systems through wireless communication as shown in FIG. 6 reduces the congestion of ones of the communication signals SG1 to SG5 to be output from the communication devices 10I to 10M provided in the distribution board, respectively, as shown in FIG. 8.

The congestion of communication signals in a transmission path can be relieved by connecting different power systems through wireless communication.

[2-2. Other Configuration]

Figure 9:
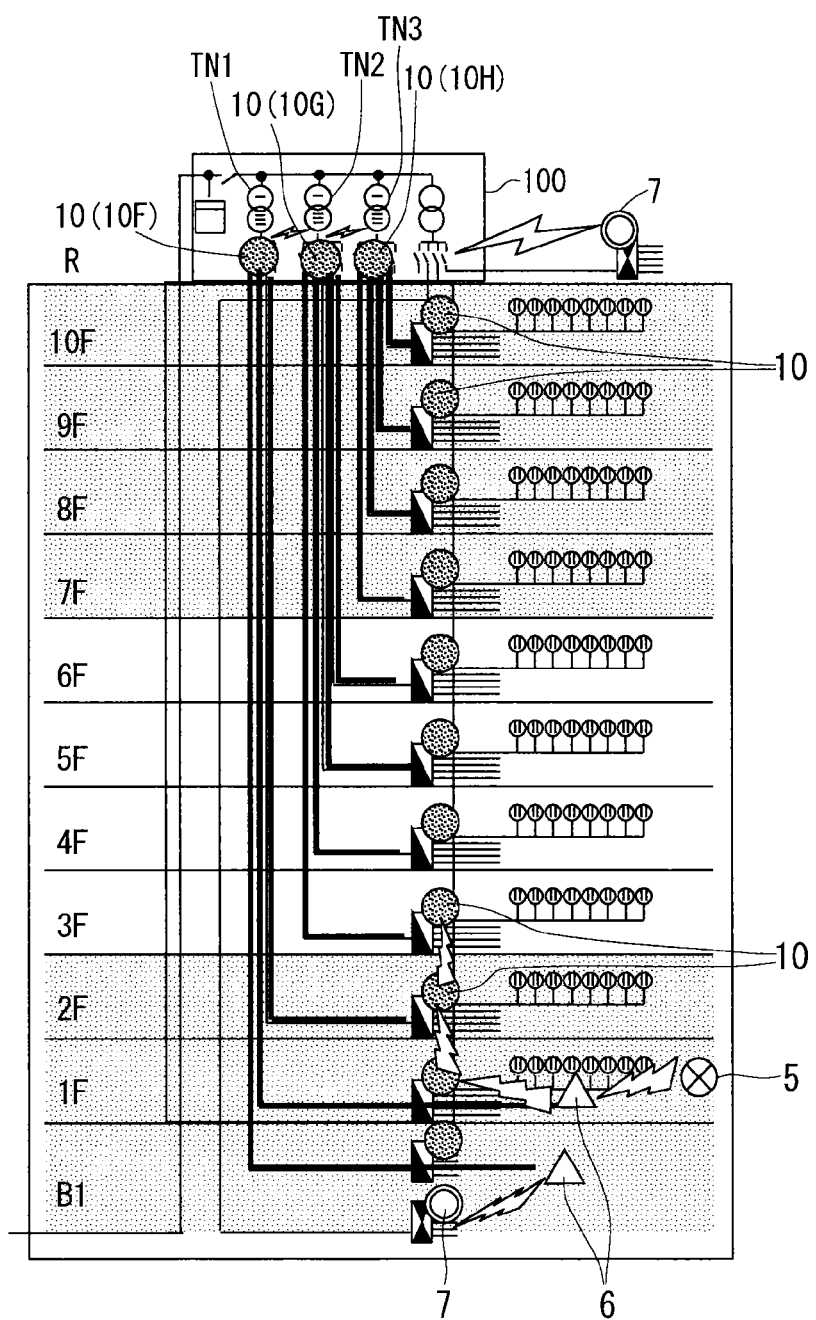
FIG. 9 shows another example configuration for the communication system according to the second embodiment.
Figure 10:
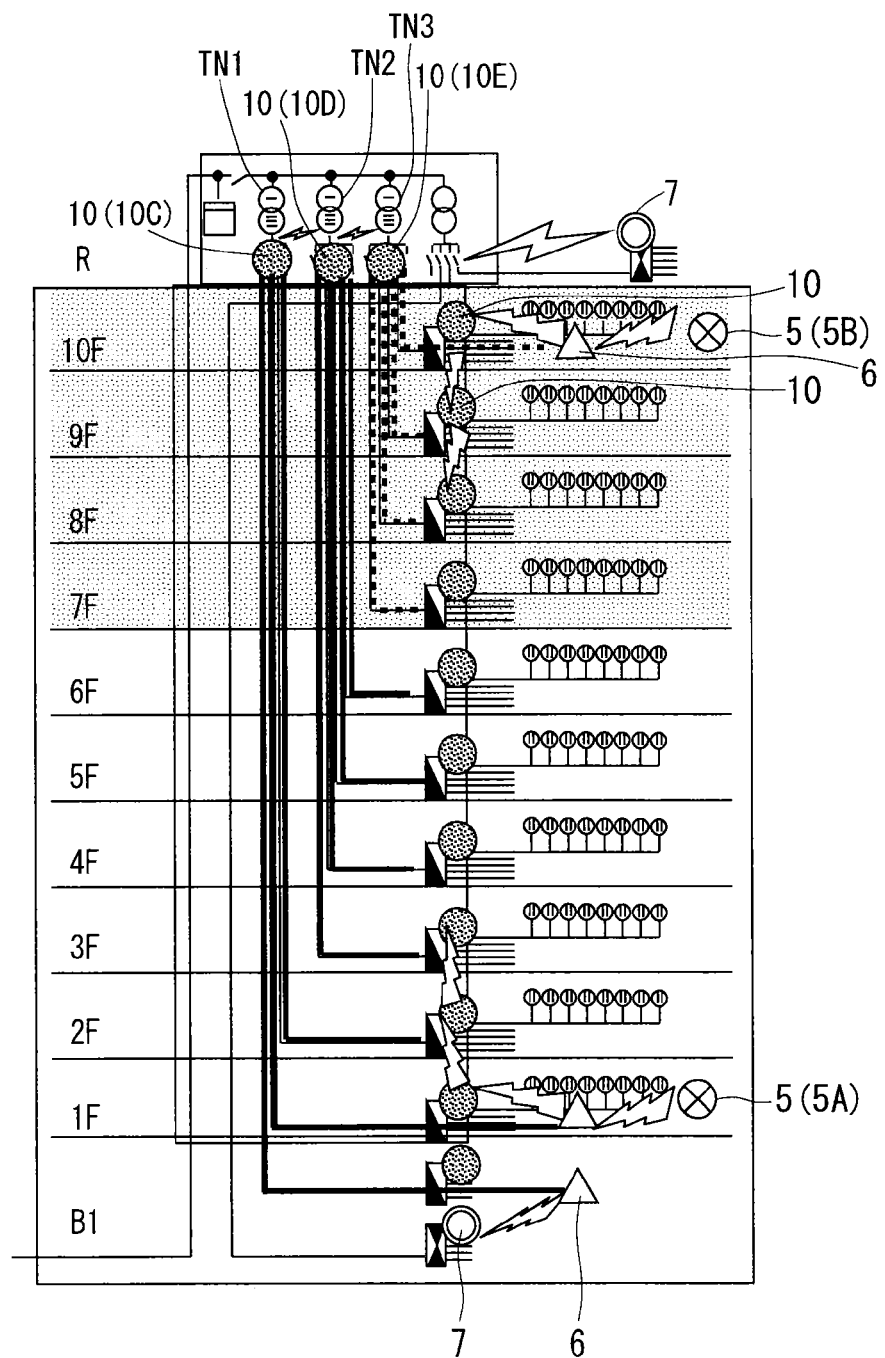
FIG. 10 shows another example configuration for the communication system according to the second embodiment.
Figure 11:
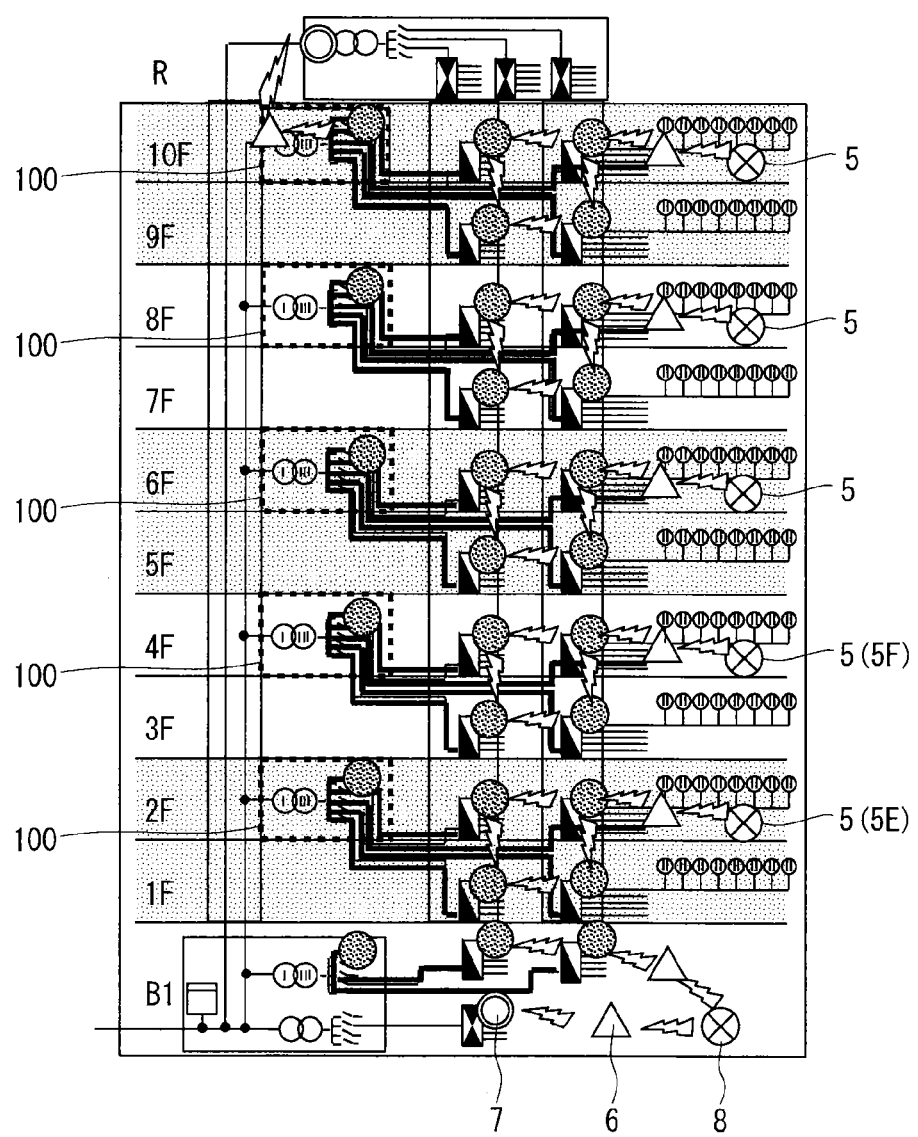
FIG. 11 shows another example configuration for the communication system according to the second embodiment.

While the case shown in FIG. 5 has been described as an example application for the communication system 1B, other example applications for the communication system 1B will be described here. FIGS. 9 to 11 show the other example applications for the communication system 1B.

First, the example application of FIG. 9 will be described.

In the example application of FIG. 5, the information collecting device 5 is configured to perform wireless communication with the communication device 10 in the distribution board 200. In the example application of FIG. 9, meanwhile, the information collecting device 5 communicates with the communication device 10 in the distribution board 200 via the tap communication device 6.

In the case where the information collecting device 5 is configured to communicate with the communication device 10 in the distribution board 200 via the tap communication device 6, the flexibility is provided to the position at which the information collecting device 5 is located.

Next, the example application of FIG. 10 will be described.

In the example application of FIG. 10, two information collecting devices 5A and 5B are provided. The first information collecting device 5A is configured to be connected to a first communication network using the power system from the first basement level (B1) to the second level (2F) and a second communication network using the power system from the third level (3F) to the sixth level (6F). The first information collecting device 5A accordingly collects amount-of-power information from the local communication devices configuring the first communication network and the local communication devices configuring the second communication network.

Meanwhile, the second information collecting device 5B is configured to be connected to a third communication network using the power system from the seventh level (7F) to the tenth level (10F). The second information collecting device 5B collects amount-of-power information from the local communication devices configuring the third communication network.

Due to the limitation of the number of settable addresses, the information collecting device 5 may limit the number of local communication devices that are allowed communication. For this reason, if the total number of local communication devices provided in a building, which are to be communication partners, exceeds the limited number, a plurality of information collecting devices 5 are used as shown in FIG. 10.

In the case where a plurality of information collecting devices 5 are used as described above, the local communication devices provided in the same power system (the local communication devices included in a single narrow-area communication network) are configured to communicate with only a single information collecting device 5, in other words, are configured not to communicate with a plurality of information collecting devices 5. For example, with reference to FIG. 10, each of the local communication devices provided in the power system for the transformer TN1 and the power system for the transformer TN2 are configured to communicate with only the first information collecting device 5A, and the local communication devices provided in the power system for the transformer TN3 are configured to communicate with only the second information collecting device 5B.

The frequency used in wireless communication is preferably changed for each of the information collecting devices 5A and 5B.

Next, the example application of FIG. 11 will be described.

In the example application of FIG. 11, the high-voltage power receiving apparatus 100 is provided on each of a plurality of levels, which makes it difficult to connect different power systems through wireless communication by the communication devices 10 respectively provided in high-voltage power receiving apparatuses 100. With reference to FIG. 11, therefore, the information collecting device 5 is installed per power system. As an example, an information collecting device 5E is installed for the power system on the first level (1F) and the second level (2F), and an information collecting device 5F is installed for the power system on the third level (3F) and the fourth level (4F).

As described above, the communication system 1B is applicable depending on the facility configuration.

3. Modifications

While the embodiments of the communication systems 1A and 1B have been described, the present invention is not limited to the description above.

For example, the first embodiment has described the case in which the first communication device 10A is provided in the high-voltage power receiving apparatus 100, which is not limited thereto. To be specific, the first communication device 10A is only required to be connected to the first power line 30M extending from the secondary side of the transformer TN in the high-voltage power receiving apparatus 100 to the primary side of the breakers BR in the distribution boards 200A and 200B, which may be provided outside the high-voltage power receiving apparatus 100. In more detail, the first communication device 10A may be connected to the first power line 30M extending from the primary side of the breaker BR in the first distribution board 200A or may be connected to the first power line 30M extending from the primary side of the breaker BR in the second distribution board 200B.

In the case where the first communication device 10A is provided in the high-voltage power receiving apparatus 100, the first communication device 10A is preferably connected to an available power line that is not connected to the primary side of the breakers BR in the distribution boards 200A and 200B among a plurality of power lines branched off from the power line 30M connected to the secondary side of the transformer TN. Such an available power line is an auxiliary power line provided for extension.

The first communication device 10A is connected to an available power line that is not connected to a load in the high-voltage power receiving apparatus 100 as described above, enabling the communication device 10 to be installed without causing a power failure in the downstream facility, device, and the like that receive power supply from the distribution board 200. This makes it easy to install the facility of the first communication device 10A and also eliminates the effects on the downstream facility when the first communication device 10A is installed.

The embodiments have described as examples the cases in which a communication network is used to transmit amount-of-power information, which is not limited thereto.

To be specific, in the case where the communication device 10 includes power measuring means as well as means for measuring the environmental information such as temperature, humidity, and carbon dioxide concentration, the measured environmental information may be transmitted using a communication network.

In the case where the communication device 10 can be connected with a sensor device capable of measuring amount-of-power information or environmental information, the sensor device may be connected to the communication device 10 to measure the amount-of-power information or environmental information, and then, the measured power information or environmental information may be transmitted through a communication network.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS 1A, 1B communication system
5, 5A, 5B, 5E, 5F information collecting device
6 tap communication device
7 three-phase communication device
10, 10A to 10C, 10F to 10M communication device (single-phase communication device)
11 power line communication section
12 wireless communication section (wireless communication means)
13 control section
14 power supply section
30M first power line
30S second power line
100 high-voltage power receiving apparatus
200, 200A, 200B distribution board
TN, TN1 to TN3 transformer
BR breaker
SP starting point
BP1, BP2 branch point
EP1 to EP3 termination
SG1 to SG5 communication signal

The invention claimed is:

1. A communication network comprising:
a first communication circuit connected in a conductive state to a first power line extending from a secondary side of a transformer in a high-voltage power receiving circuit to a primary side of breakers in a plurality of distribution boards that receive power supply from the transformer, said first communication circuit being configured to perform power line communication using said first power line as a transmission path; and
a plurality of second communication circuits respectively connected to a plurality of second power lines respectively extending from a secondary side of said breakers in said plurality of distribution boards, each of said plurality of second communication circuits being configured to perform power line communication using each of the second power lines respectively connected thereto as a transmission path,
wherein upon receipt of a communication signal, each of said first communication circuit and said plurality of second communication circuits is configured to generate a new communication signal including information included in said communication signal and to send said new communication signal through power line communication such that all of said first communication circuit and said plurality of second communication circuits function as repeaters in transmitting said information,
said first communication circuit is configured to perform wireless communication,
said high-voltage power receiving circuit has a plurality of transformers therein, and
said first communication circuit is provided for each of the transformers in said high-voltage power receiving circuit.

2. The communication network according to claim 1, wherein said first communication circuit is connected to a point on a transmission path at which an amount of attenuation of a communication signal is halved when power line communication is directly performed between a second communication circuit and another second communication circuit, which are included in said plurality of second communication circuits, using a power line coupling said second communication device and said another second communication circuit as a transmission path.

3. The communication network according to claim 1, wherein
said first power line branches off into a plurality of power lines to be connected to the primary side of said breakers in said plurality of distribution boards, and
said first communication circuit is connected to an available power line that is not connected with the primary side of said breakers in said plurality of distribution boards among the plurality of power lines branched off from said first power line.

4. The communication network according to claim 1, wherein
said first communication circuits are configured to wirelessly communicate with each other.

5. The communication network according to claim 1, further comprising a host communication circuit that is configured to perform wireless communication, wherein
each of said plurality of second communication circuits is configured to
measure a power consumption amount of a load that receives power supply from each of the distribution boards, and
perform wireless communication,
each of said plurality of second communication circuits is configured to send a communication signal including information on said power consumption amount through power line communication and wireless communication, and
said host communication circuit is configured to wirelessly collect the information on said power consumption amount via said plurality of second communication circuits.

6. A wide-area communication network, comprising:
a plurality of narrow-area communication networks respectively corresponding to a plurality of transformers in a high-voltage power receiving circuit; and
a plurality of host communication circuits configured to perform wireless communication, wherein
each of said plurality of narrow-area communication networks includes:
a first communication circuit connected in a conductive state to a first power line extending from a secondary side of a corresponding transformer among said plurality of transformers in said high-voltage power receiving circuit to a primary side of breakers in a plurality of distribution boards that receive power supply from said transformers, said first communication circuit being configured to perform power line communication using said first power line as a transmission path; and
a plurality of second communication circuits respectively connected to a plurality of second power lines respectively extending from a secondary side of said breakers in said plurality of distribution boards, each of said plurality of second communication circuits being configured to perform power line communication using each of the second power lines respectively connected thereto as a transmission path,
in each of said plurality of narrow-area communication networks, upon receipt of a communication signal, each of said first communication circuit and said plurality of second communication devices is configured to generate a new communication signal including information included in the communication signal and to send the new communication signal through power line communication such that all of said first communication circuit and said plurality of second communication circuits function as repeaters in transmitting said information,
in each of said plurality of narrow-area communication networks, said plurality of second communication circuits are configured to communicate with only a single host communication circuit among said plurality of host communication circuits,
said first communication circuit is configured to perform wireless communication,
said high-voltage power receiving circuit has a plurality of transformers therein, and
said first communication circuit is provided for each of the transformers in said high-voltage power receiving circuit.

* * * * *